(12) United States Patent
Fletcher et al.

(10) Patent No.: US 8,099,207 B2
(45) Date of Patent: Jan. 17, 2012

(54) METHOD FOR DETERMINING THE PERFORMANCE OF MOTOR VEHICLE CONSUMABLES

(75) Inventors: Timothy Edward Fletcher, Abingdon (GB); William Hugh Preston, Upper Basildon (GB)

(73) Assignee: Castrol Limited, Wiltshire (GB)

( * ) Notice: Subject to any disclaimer, the term of this patent is extended or adjusted under 35 U.S.C. 154(b) by 408 days.

(21) Appl. No.: 12/310,715

(22) PCT Filed: Aug. 16, 2007

(86) PCT No.: PCT/GB2007/003144
§ 371 (c)(1),
(2), (4) Date: Mar. 5, 2009

(87) PCT Pub. No.: WO2008/029078
PCT Pub. Date: Mar. 13, 2008

(65) Prior Publication Data
US 2009/0326756 A1     Dec. 31, 2009

(30) Foreign Application Priority Data
Sep. 8, 2006   (EP) .................................... 06254700

(51) Int. Cl.
*G01M 17/00* (2006.01)
(52) U.S. Cl. ................. 701/29; 701/53; 701/54; 701/86
(58) Field of Classification Search ............ 701/29, 701/53, 54, 86
See application file for complete search history.

(56) References Cited

U.S. PATENT DOCUMENTS

| 3,930,409 A | 1/1976 | Ostrander et al. |
| 6,564,172 B1 * | 5/2003 | Till ............................. 702/182 |

(Continued)

FOREIGN PATENT DOCUMENTS

| GB | 1167722 | 10/1969 |
| WO | 98/49254 | 11/1998 |

OTHER PUBLICATIONS

International Search Report for PCT/GB2007/003144, mailed Nov. 16, 2007.

(Continued)

*Primary Examiner* — Toan To
(74) *Attorney, Agent, or Firm* — Nixon & Vanderhye

(57) ABSTRACT

Method for determining the performance of a motor vehicle consumable, including engine lubricant, fuel and tires in a motor vehicle having an engine with at least one fuel injection valve, a lubricating system and a CANbus network having at least three network nodes, each operably connected to a computer. The method includes operating the vehicle while supplying the engine with fuel through a fuel injection valve and lubricating the engine with the engine lubricant. A first CANbus network node transmits to the computer a signal indicative of the engine fuelling rate based upon the opening time of a fuel injection valve. One or more second CANbus network nodes transmit signals to the computer indicative of one or more variables indicative of the power output of the engine, and one or more third CANbus network nodes transmit signals to the computer indicative of the vehicle operating conditions. The computer calculates a corrected power output indicative of the power output of the engine corrected for the vehicle operating conditions using the one or more signals transmitted to the computer by the second and third CANbus network nodes and a pre-determined algorithm, and the computer transmits and/or stores the corrected power output and the signal indicative of the engine fuelling rate.

20 Claims, 1 Drawing Sheet

U.S. PATENT DOCUMENTS

| | | | | |
|---|---|---|---|---|
| 6,860,833 | B2* | 3/2005 | Ayabe | 477/121 |
| 6,869,931 | B1* | 3/2005 | McCrae | 514/13.3 |
| 6,993,421 | B2* | 1/2006 | Pillar et al. | 701/33 |
| 7,171,295 | B2* | 1/2007 | Furuno et al. | 701/50 |
| 7,211,027 | B2* | 5/2007 | Sakamoto et al. | 477/107 |
| 7,627,411 | B2* | 12/2009 | Kuwahara et al. | 701/55 |
| 2010/0241322 | A1* | 9/2010 | Miyanoo | 701/54 |
| 2011/0087397 | A1* | 4/2011 | Iraha et al. | 701/29 |

OTHER PUBLICATIONS

Written Opinion of the International Searching Authority for PCT/GB2007/003144, mailed Nov. 16, 2007.

FMS-Standard Interface Description-FMS-Standard Working Group Dec. 9, 2005 (18 pages).

SAE J1939-On Highways Section, Surface Vehicle Standard, Copyright 2000 Society of Automotive Engineers, Inc. (7 pages).

Web page www.squarell.com/KbFMS.htm. Squarrell Technology, Feb. 2006, (2 pages).

Preliminary Report on Patentability for PCT/GB2007/003144, mailed Nov. 16, 2007.

Web page www.fms-standard.com, Information about the FMS-Standard, Jan. 14, 2009 (2 pgs).

\* cited by examiner

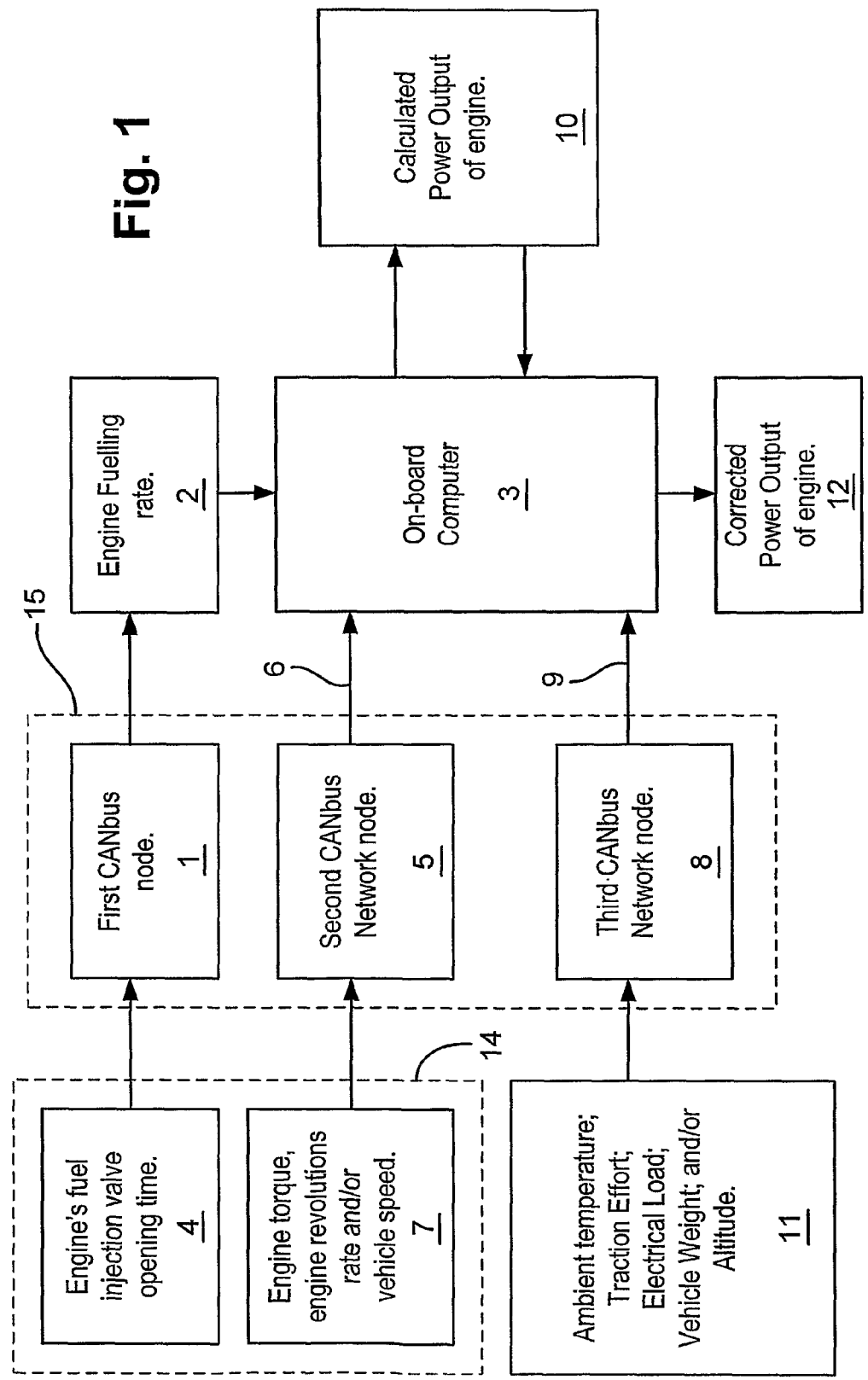

METHOD FOR DETERMINING THE PERFORMANCE OF MOTOR VEHICLE CONSUMABLES

This application is the U.S. national phase of International Application No. PCT/GB2007/003144, filed 16 Aug. 2007, which designated the U.S. and claims priority to European Application No. 06254700.5, filed 8 Sep. 2006, the entire contents of each of which are hereby incorporated by reference.

This invention relates to a method for determining the performance of motor vehicle consumables and in particular to a method for determining the performance of at least one motor vehicle consumable selected from the group consisting of engine lubricant, fuel and tyres.

BACKGROUND OF THE INVENTION

Determination of the performance of motor vehicle consumables such as engine lubricants, fuel and tyres is useful as part of the process of developing new lubricants, fuels and tyres. Determination of the performance of such consumables can be undertaken by operating the vehicle under standard conditions such as in a laboratory on a "rolling road" or by operating the engine out of the engine on a test bed. A disadvantage with such methods, is that operating conditions may not correspond to actual operating conditions in general use by the vehicle.

Determination of the performance of engine lubricant, fuel or tyres by operating the vehicle in a road test has a disadvantage that great care has to be taken to achieve comparable operating conditions for comparison between different engine lubricants, fuels or tyres.

There remains a need for a method for determining the performance of motor vehicle consumables such as engine lubricant, fuel and tyres which overcomes or at least mitigates these problems.

SUMMARY OF THE INVENTION

Thus, according to the present invention, there is provided a method for determining the performance of at least one motor vehicle consumable selected from the group consisting of engine lubricant, fuel and tyres in a motor vehicle, having an engine with at least one fuel injection valve, a lubricating system and a CANbus network comprising at least three network nodes, each operably connected to a computer, which method comprises:
operating the vehicle whilst supplying the engine with the fuel through at least one fuel injection valve and lubricating the engine with the engine lubricant characterised in that:
a first CANbus network node transmits to the computer, a signal indicative of the engine fuelling rate based upon the opening time of at least one of the fuel injection valves; one or more second CANbus network nodes transmit one or more signals to the computer indicative of one or more variables indicative of the power output of the engine;
one or more third CANbus network nodes transmit one or more signals to the computer indicative of the vehicle operating conditions;
the computer calculates a variable (Corrected Power Output) indicative of the power output of the engine corrected for the vehicle operating conditions using the one or more signals transmitted to the computer by the one or more second CANbus network nodes, the one or more signals transmitted to the computer by the one or more third CANbus network nodes and a pre-determined algorithm; and
the computer transmits and/or stores the Corrected Power Output and the signal indicative of the engine fuelling rate.

The present invention solves the technical problem defined above by using a CANbus signal indicative of the fuelling rate based upon the opening time of at least one of the fuel injection valves. Such an engine fueling rate is generally more accurate than a rate based upon the amount of fuel in the vehicle's fuel tank.

The present invention solves the technical problem defined above also by calculating a variable (Corrected Power Output) indicative of the power output of the engine corrected for the vehicle operating conditions using the one or more signals transmitted to the computer by the one or more second CANbus network nodes, the one or more signals transmitted to the computer by the one or more third CANbus network nodes and a pre-determined algorithm.

The present invention allows the Corrected Power Output and a signal indicative of the engine fuelling rate to be collected under actual operating conditions of the engine in the vehicle. Although, the present invention may be used in a vehicle operated on a rolling road, preferably the method of the present invention is used to obtain Corrected Power Output and signal indicative of engine fuelling rate in a road test, which has an advantage of providing "real world" data.

The motor vehicle used in the present invention may be any vehicle fitted with a CANbus system. The vehicle used in the present invention may be a hybrid vehicle.

The engine used in the present invention may be a spark ignition engine and/or a compression ignition engine.

CANbus is a serial communication system used on motor vehicles to connect individual systems and sensors, as an alternative to conventional multi-wire looms. CAN is an acronym for Controller Area Network. It is becoming increasingly common on passenger cars and commercial vehicles. The entirety of the data which can be obtained from a CANbus is defined in SAE J1939 standard.

The CANbus network nodes may conform to the FMS CANbus standard. The FMS CANbus standard is an agreement between the European commercial vehicle manufacturers to standardise CANbus information from trucks and buses (FMS stands for Fleet Management System). The goal of the standard is to provide means to get vehicle information using CANbus technology in a known and standardized way. The FMS CANbus system is available on European truck makes such as those of DAF, Mercedes Benz, Scania, Volvo, MAN, Iveco and Renault. Not all FME CANbus systems may provide all of the data available according to the FMS CANbus standard. The full specification may be obtained from www-.fms-standard.com.

The CANbus network nodes transmit signals to the computer indicative at least of the following:
(a) engine fuelling rate based upon the opening time of at least one of the fuel injection valves;
(b) one or more variables indicative of the power output of the engine which may be one or more variables selected from the group consisting of:
Reference engine torque,
Nominal frictional percentage torque,
Actual engine percentage torque,
Driver demand engine percentage torque,
Engine speed,
Engine load,
Wheel based vehicle speed,
Boost pressure,
Intake manifold temperature,
Alternator current,
Alternator potential, Engine torque,
Engine revolutions rate,
Vehicle speed, and
combinations thereof; and
(c) the vehicle operating conditions which may be one or more operating conditions selected from the group consisting of:
Ambient air temperature,
Intake manifold temperature,
Vehicle weight,
Charging system potential (voltage),
electrical load,
Tractive effort and
combinations thereof.

Altitude is also a vehicle operating condition which may be used in the present invention, but this may be available from a Global Positioning System (GPS) which may feed a signal directly to the computer.

The CANbus may operate at a bus speed of up to 1 MHz, for example at 250 KHz. The CANbus network nodes may be FMS CANbus nodes. The FMS CANbus specification is available from web page www.fms-standard.com.

The data which may be retrieved from the CANbus using the FMS standard may be one or more data selected from the group consisting of:
Actual vehicle speed
Total distance of the truck during its life
Actual fuel consumption
Total fuel consumption during truck life
Tachograph speed
Tachograph driver knobs status
Tachograph warnings of exceeding drive time regulations
Tachograph over-reving and direction indicator
Vehicle Identification (VIN number)
Brake Switch
Cruise Control status
Clutch switch
PTO (Power take-off, that is use of engine to drive ancillary systems for example, pumps or lifting devices) on/off
Throttle position
Axle weight and position
Total running hours
Next regular maintenance and
Engine temperature Since many different vehicle systems may share the same bus hardware, it is important that available CANbus bandwidth is allocated to the most safety critical systems first. Nodes may be assigned to one of three priority levels. For example, commands to activate safety systems such as engine controls, brakes and airbags may be given highest priority and will be actioned before less critical ones. Audio and navigation devices may be given medium priority, and simple activation of lighting may be given the lowest priority. A process known as arbitration may decide the priority of any messages. In practice, to the user, all actions may appear to be immediate.

The CANbus network nodes may be connected to the computer by wireless connections. Preferably, the CANbus network nodes may be connected to the computer directly through electrical cables. The CANbus network nodes may transmit signals to an on-board processor which may sort and/or store the data before transmitting the data to the computer which may be an on-board computer or a computer remote from the vehicle.

The computer may be remote from the vehicle or may be an on-board computer on the vehicle.

The on-board computer may comprise:
a communications device and antenna,
a positioning device and antenna,
a screen and keyboard to interact with the driver of the vehicle, and
a unit with electronics and programs.

The on-board computer may support the driver of the vehicle with navigation, communication, order handling, man hour/activity registration, positioning and the like. The on-board computer may be connected to the tachograph of the vehicle. The tachograph may be equipped with CANbus interfaces.

The on-board computer may transmit the Corrected Power Output and the signal indicative of the engine fuelling rate through a satellite, mobile phone, 2-way radio or other wireless communications device. The on-board computer may alternatively or additionally store the Corrected Power Output and the signal indicative of the engine fuelling.

The signals from the CANbus and/or the Corrected Power Output and the signal indicative of the engine fuelling may be placed in data storage bins so that data obtained with the same, similar or comparable Corrected Power Output may be compared with each other to determine the relative engine fuelling rate(s) at that same, similar or comparable Corrected Power Output.

The computer may calculate a variable (Calculated Power Output) indicative of the power output of the engine using the one or more signals transmitted to the computer by the one or more second CANbus network nodes and correct the Calculated Power Output of the engine according to a predetermined algorithm using the one or more signals transmitted to the computer by the one or more third CANbus network nodes to give the Corrected Power Output. The computer may calculate the Calculated Power Output and the Corrected Power Output concurrently or sequentially. Preferably, the computer calculates the Calculated Power Output and then corrects the Calculated Power Output of the engine according to a predetermined algorithm using the one or more signals transmitted to the computer by the one or more third CANbus network nodes to give the Corrected Power Output.

The Corrected Power Output and the signal indicative of the engine fuelling rate determined according to the present invention provide a measure of the performance of the at least one motor vehicle consumable selected from the group consisting of engine lubricant, fuel and tyres.

The Corrected Power Output and the signal indicative of the engine fuelling rate transmitted and/or stored by the computer may be compared with at least one set of data for the Corrected Power Output and signal indicative of the engine fuelling rate obtained using at least one different motor vehicle consumable selected from the group consisting of engine lubricants, fuels and tyres. Sets of data comprising the Corrected Power Output and the signal indicative of the engine fuelling rate transmitted and/or stored by the computer may be collected whilst operating the vehicle over a period of time. Additional sets of data may be collected when operating the vehicle with one or more different vehicle consumables. The performance of at least one the vehicle consumables may be determined from one or more of such sets of data. In particular, by selecting data having the same, similar or comparable Corrected Power Output but obtained using different vehicle consumables, the performance of those consumables may be determined and/or compared by comparing the signals indicative of the engine fuelling rate for data having the same, similar or comparable Corrected Power Output.

The method of the present invention allows the vehicle to be operated over a period of time without necessarily seeking to achieve comparable operating conditions. By collecting sufficient sets of data comprising the Corrected Power Output and the signal indicative of the engine fuelling rate, at least one set of data will have a Corrected Power Output which is the same, similar or comparable to the Corrected Power Output of a data set obtained using a different vehicle consumable, thus allowing comparison of the signals indicative of engine fuelling rate between those data sets at the same, similar or comparable Corrected Power Output. Such a comparison may be used to determine or compare the performance of the vehicle consumables.

Sets of data comprising the Corrected Power Output and the signal indicative of the engine fuelling rate transmitted and/or stored by the computer may be collected whilst operating the vehicle in two or more operating periods each with different engine lubricants but with the same fuel and tyres. By collecting sufficient sets of data from each of the operating periods, at least one data set from each of two operating periods may have the same, similar or comparable Corrected Power Output. By comparing the signals indicative of engine fuelling rate for those data sets with the same, similar or comparable Corrected Power Output but with different engine lubricants, the relative performance of the lubricants may be determined.

Sets of data comprising the Corrected Power Output and the signal indicative of the engine fuelling rate transmitted and/or stored by the computer may be collected whilst operating the vehicle in two or more operating periods each with different fuel but with the same engine lubricant and tyres. By collecting sufficient sets of data from each of the operating periods, at least one data set from each of two operating periods may have the same, similar or comparable Corrected Power Output. By comparing the signals indicative of engine fuelling rate for those data sets with the same, similar or comparable Corrected Power Output but with different fuels, the relative performance of the fuels may be determined.

Sets of data comprising the Corrected Power Output and the signal indicative of the engine fuelling rate transmitted and/or stored by the computer may be collected whilst operating the vehicle in two or more operating periods each with different tyres but with the same engine lubricant and fuel. By collecting sufficient sets of data from each of the operating periods, at least one data set from each of two operating periods may have the same, similar or comparable Corrected Power Output. By comparing the signals indicative of engine fuelling rate for those data sets with the same, similar or comparable Corrected Power Output but with different tyres, the relative performance of the tyres may be determined.

The method of the present invention may be used in evaluating motor vehicle consumables selected from the group consisting of engine lubricants, fuels and tyres, and preferably in evaluating new engine lubricants and/or fuels.

The method of the present invention may be used to provide marketing information about the motor vehicle consumables.

The method of the present invention may be used to provide customers or potential customers with information about the performance of the motor vehicle consumable.

The method of the present invention has the benefit of eliminating or least mitigating variability due to driver variation and/or weather conditions.

BRIEF DESCRIPTION OF THE DRAWINGS

The invention will now be described by way of example only and with reference to the accompany drawings in which FIG. 1 represents in schematic form, the transmission of signals to a computer as in the method of the present invention.

DETAILED DESCRIPTION OF PREFERRED EMBODIMENTS

Referring to FIG. 1, a motor vehicle (not shown) having an engine (14) with at least one fuel injection valve (not shown), a lubricating system (not shown) and a CANbus network (15) is operated whilst supplying the engine with fuel through at least one fuel injection valve and lubricating the engine with the engine lubricant.

A first CANbus network node (1) transmits a signal (2) to a computer (3) indicative of the engine fuelling rate based upon the opening time (4) of at least one of the engine's fuel injection valves. One or more second CANbus network nodes (5) transmit one or more signals (6) to the computer (3) indicative of one or more variables indicative of the power output of the engine. One or more third CANbus network nodes (8) transmit one or more signals (9) to the computer (3) indicative of the vehicle operating conditions. The computer (3) calculates a variable (Corrected Power Output) (12) indicative of the power output of the engine using the one or more signals (6) transmitted to the computer (3) by the one or more second CANbus network nodes (5), the one or more signals (9) transmitted to the computer (3) by the one or more third CANbus network nodes (8) and a pro-determined algorithm. The computer transits and/or stores the Corrected Power Output (12) and the signal (2) indicative of the engine fuelling rate.

The computer (3) may calculate a variable (Calculated Power Output) (10) indicative of the power output of the engine using the one or more signals (6) transmitted to the computer (3) by the one or more second CANbus network nodes (5) and then correct the Calculated Power Output (10) of the engine according to a predetermined algorithm using the one or more signals (9) transmitted to the computer (3) by the one or more third CANbus network nodes (8) to give the Corrected Power Output (12).

Sets of data comprising the Corrected Power Output and the signal indicative of the engine fuelling rate transmitted and/or stored by the computer may be collected whilst operating the vehicle over a period of time. Additional sets of data may be collected when operating the vehicle with one or more different vehicle consumables. The performance of at least one the vehicle consumables may be determined from one or more of such sets of data. In particular, by selecting data having the same, similar or comparable Corrected Power Output but obtained using different vehicle consumables, the performance of those consumables may be determined and/or compared by comparing the signals indicative of the engine fuelling rate for data having the same, similar or comparable Corrected Power Output.

The invention claimed is:

1. A method for determining the performance of at least one motor vehicle consumable selected from the group consisting of engine lubricant, fuel and tyres, in a motor vehicle having an engine with at least one fuel injection valve, a lubricating system and a CANbus network comprising at least three network nodes, each operably connected to a computer, which method comprises:

operating the vehicle whilst supplying the engine with the fuel through at least one fuel injection valve and lubricating the engine with the engine lubricant characterised in that: a first CANbus network node transmits to the computer, a signal indicative of the engine fuelling rate based upon the opening time of at least one of the fuel injection valves; one or more second CANbus network nodes transmit one or more signals to the computer indicative of one or more variables indicative of the power output of the engine;

one or more third CANbus network nodes transmit one or more signals to the computer indicative of the vehicle operating conditions;

the computer calculates a variable (Corrected Power Output) indicative of the power output of the engine corrected for the vehicle operating conditions using the one or more signals transmitted to the computer by the one or more second CANbus network nodes, the one or more signals transmitted to the computer by the one or more third CANbus network nodes and a pre-determined algorithm; and the computer transmits and/or stores the Corrected Power Output and the signal indicative of the engine fuelling rate.

2. A method as claimed in claim 1 in which the computer calculates a variable (Calculated Power Output) indicative of the power output of the engine using the one or more signals transmitted to the computer by the one or more second CANbus network nodes and the computer corrects the Calculated Power Output of the engine according to a predetermined algorithm using the one or more signals transmitted to the computer by the one or more third CANbus network nodes to give the Corrected Power Output.

3. A method as claimed in claim 2 in which the computer calculates the Calculated Power Output and then corrects the Calculated Power Output of the engine according to a predetermined algorithm using the one or more signals transmitted to the computer by the one or more third CANbus network nodes to give the Corrected Power Output.

4. A method as claimed in claim 1 in which the one or more variables indicative of the power output of the engine is selected from the group consisting of: reference engine torque, nominal frictional percentage torque, actual engine percentage torque, driver demand engine percentage torque, engine speed, engine load, wheel based vehicle speed, boost pressure, intake manifold temperature, alternator current, alternator potential, engine torque, engine revolutions rate, vehicle speed, and combinations thereof.

5. A method as claimed in claim 2 in which the one or more variables indicative of the power output of the engine is selected from the group consisting of: reference engine torque, nominal frictional percentage torque, actual engine percentage torque, driver demand engine percentage torque, engine speed, engine load, wheel based vehicle speed, boost pressure, intake manifold temperature, alternator current, alternator potential, engine torque, engine revolutions rate, vehicle speed, and combinations thereof.

6. A method as claimed in claim 1 in which the vehicle operating conditions are one or more operating conditions selected from the group consisting of: ambient air temperature, intake manifold temperature, vehicle weight, charging system potential (voltage), electrical load, tractive effort and combinations thereof.

7. A method as claimed in claim 2 in which the vehicle operating conditions are one or more operating conditions selected from the group consisting of: ambient air temperature, intake manifold temperature, vehicle weight, charging system potential (voltage), electrical load, tractive effort and combinations thereof.

8. A method as claimed in claim 4 in which the vehicle operating conditions are one or more operating conditions selected from the group consisting of: ambient air temperature, intake manifold temperature, vehicle weight, charging system potential (voltage), electrical load, tractive effort and combinations thereof.

9. A method as claimed in claim 5 in which the vehicle operating conditions are one or more operating conditions selected from the group consisting of: ambient air temperature, intake manifold temperature, vehicle weight, charging system potential (voltage), electrical load, tractive effort and combinations thereof.

10. A method as claimed in claim 1 in which the Corrected Power Output and the signal indicative of the engine fuelling rate transmitted and/or stored by the computer are compared with at least one set of data for the Corrected Power Output and signal indicative of the engine fuelling rate obtained using at least one different motor vehicle consumable selected from the group consisting of engine lubricants, fuels and tyres.

11. A method as claimed in claim 2 in which the Corrected Power Output and the signal indicative of the engine fuelling rate transmitted and/or stored by the computer are compared with at least one set of data for the Corrected Power Output and signal indicative of the engine fuelling rate obtained using at least one different motor vehicle consumable selected from the group consisting of engine lubricants, fuels and tyres.

12. A method as claimed in claim 4 in which the Corrected Power Output and the signal indicative of the engine fuelling rate transmitted and/or stored by the computer are compared with at least one set of data for the Corrected Power Output and signal indicative of the engine fuelling rate obtained using at least one different motor vehicle consumable selected from the group consisting of engine lubricants, fuels and tyres.

13. A method as claimed in claim 6 in which the Corrected Power Output and the signal indicative of the engine fuelling rate transmitted and/or stored by the computer are compared with at least one set of data for the Corrected Power Output and signal indicative of the engine fuelling rate obtained using at least one different motor vehicle consumable selected from the group consisting of engine lubricants, fuels and tyres.

14. A method as claimed in claim 8 in which the Corrected Power Output and the signal indicative of the engine fuelling rate transmitted and/or stored by the computer are compared with at least one set of data for the Corrected Power Output and signal indicative of the engine fuelling rate obtained using at least one different motor vehicle consumable selected from the group consisting of engine lubricants, fuels and tyres.

15. A method as claimed in claim 9 in which the Corrected Power Output and the signal indicative of the engine fuelling rate transmitted and/or stored by the computer are compared with at least one set of data for the Corrected Power Output and signal indicative of the engine fuelling rate obtained using at least one different motor vehicle consumable selected from the group consisting of engine lubricants, fuels and tyres.

16. A method as claimed in claim 10 in which sets of data comprising the Corrected Power Output and the signal indicative of the engine fuelling rate transmitted and/or stored by the computer are collected whilst operating the vehicle in two or more operating periods each with different engine lubricants but with the same fuel and tyres.

17. A method as claimed in claim 10 in which sets of data comprising the Corrected Power Output and the signal indicative of the engine fuelling rate transmitted and/or stored by the computer are collected whilst operating the vehicle in two or more operating periods each with different fuel but with the same engine lubricant and tyres.

18. A method as claimed in claim 10 in which sets of data comprising the Corrected Power Output and the signal indicative of the engine fuelling rate transmitted and/or stored by the computer are collected whilst operating the vehicle in two or more operating periods each with different tyres but with the same engine lubricant and fuel.

19. A method as claimed in claim 14 in which sets of data comprising the Corrected Power Output and the signal indicative of the engine fuelling rate transmitted and/or stored by the computer are collected whilst operating the vehicle in two or more operating periods each with different engine lubricants but with the same fuel and tyres.

20. A method as claimed in claim 15 in which sets of data comprising the Corrected Power Output and the signal indicative of the engine fuelling rate transmitted and/or stored by the computer are collected whilst operating the vehicle in two or more operating periods each with different engine lubricants but with the same fuel and tyres.

* * * * *